United States Patent
Deu-Ngoc et al.

(10) Patent No.: US 8,576,790 B2
(45) Date of Patent: Nov. 5, 2013

(54) METHOD AND APPARATUS FOR MAXIMUM TUNNEL RESET

(75) Inventors: Joseph Tu-Long Deu-Ngoc, Maryhill (CA); Jeremy Thompson, Waterloo (CA); Fraser Gibbs, Waterloo (CA)

(73) Assignee: BlackBerry Limited, Waterloo, CA (US)

( * ) Notice: Subject to any disclaimer, the term of this patent is extended or adjusted under 35 U.S.C. 154(b) by 358 days.

(21) Appl. No.: 12/956,864

(22) Filed: Nov. 30, 2010

(65) Prior Publication Data

US 2011/0292889 A1 Dec. 1, 2011

Related U.S. Application Data

(60) Provisional application No. 61/349,973, filed on May 31, 2010.

(51) Int. Cl.
*H04W 4/00* (2009.01)
(52) U.S. Cl.
USPC .......................................................... 370/329
(58) Field of Classification Search
None
See application file for complete search history.

(56) References Cited

U.S. PATENT DOCUMENTS

| | | | |
|---|---|---|---|
| 2005/0265279 A1 | 12/2005 | Markovic et al. | |
| 2006/0095572 A1* | 5/2006 | Burke et al. | 709/227 |
| 2006/0203763 A1* | 9/2006 | Willey | 370/328 |
| 2009/0279489 A1* | 11/2009 | Deu-Ngoc et al. | 370/329 |
| 2010/0035643 A1* | 2/2010 | Omar | 455/509 |
| 2010/0180028 A1* | 7/2010 | Deason | 709/225 |

FOREIGN PATENT DOCUMENTS

EP 2234448 A1 9/2010

OTHER PUBLICATIONS

EP application No. 10193105.3, Extended European Search Report dated Feb. 28, 2011.

* cited by examiner

*Primary Examiner* — Phirin Sam
*Assistant Examiner* — Hai-Chang Hsiung
(74) *Attorney, Agent, or Firm* — Moffat & Co.

(57) ABSTRACT

A method and apparatus for resetting a maximum tunnel watermark, the method starting a reset timer for a maximum tunnel count at a mobile device; on expiration of the reset timer, checking whether a current value for the maximum tunnel count is less than a maximum value for the maximum tunnel count, and if yes, setting the current value of the maximum tunnel count to the maximum value of the maximum tunnel count.

18 Claims, 4 Drawing Sheets

| LA 210 | Reset 212 | Timer 214 | Watermark 216 |
|---|---|---|---|
| 1358 | N | 1140 sec | 2 |
| 1456 | Y | 0 sec | 1 |
| 1259 | N | 393 sec | 3 |
| 1739 | N | 767 sec | 3 |

Watermark reset: Y — 320

| LA <br> 210 | Reset <br> 212 | Timer <br> 214 | Watermark <br> 216 |
|---|---|---|---|
| 1358 | N | 1140 sec | 2 |
| 1456 | Y | 0 sec | 1 |
| 1259 | N | 393 sec | 3 |
| 1739 | N | 767 sec | 3 |

Watermark reset: Y

FIG 3

METHOD AND APPARATUS FOR MAXIMUM TUNNEL RESET

RELATED APPLICATIONS

The present disclosure claims priority from U.S. provisional application No. 61/349,973 filed May 31, 2010, the entire contents of which are incorporated herein by reference.

FIELD OF THE DISCLOSURE

The present disclosure relates to radio bearers for mobile devices and in particular to the establishment of tunnels for communication from mobile devices.

BACKGROUND

A mobile device requires the establishment of a radio access bearer in order to communicate with the wireless network infrastructure. Furthermore, some devices allow the establishment of multiple radio access bearers for communications. In one instance, multiple radio access bearers can be dependent on the device requiring multiple packet data protocol (PDP) contexts. Thus, for example, a device may have a proprietary PDP context for the manufacturer of the device, a general wireless application protocol (WAP) context for browsing, a multimedia messaging service (MMS) PDP context for MMS applications, a streaming media PDP context for streaming media applications, among others. As will be appreciated, a PDP context is a term that is generally referred to in the third generation partnership project (3GPP) and more generally the term "tunnel" is used herein to refer to a data connection to a particular network.

Various networks or network conditions may determine how many tunnels can be opened between a device and the network. The number of tunnels that can simultaneously be open on the device is called a "watermark".

The watermark for a network may change over time. For example, during a peak traffic period the watermark may be set to one to limit the amount of data traffic. However, in an off-peak period, the watermark may for example be set to three, meaning that three tunnels may be open between a mobile device and the network.

The setting of the watermark at the device may lead to the device using the setting until the radio is cycled. Therefore, if the mobile device sets the watermark to one during a peak period, it may be unable to utilize three tunnels in a subsequent non-peak period.

BRIEF DESCRIPTION OF THE DRAWINGS

The present disclosure will be better understood with reference to the drawings, in which:

FIG. 3 is a block diagram showing a reset table as well as a current watermark.

DETAILED DESCRIPTION OF THE DRAWINGS

The present disclosure provides a method comprising: starting a reset timer for a maximum tunnel count at a mobile device; on expiration of the reset timer, checking whether a current value for the maximum tunnel count is less than a maximum value for the maximum tunnel count, and if yes, setting the current value of the maximum tunnel count to the maximum value of the maximum tunnel count.

The present disclosure further provides a mobile device comprising: a processor; a communications subsystem; and memory; wherein the processor, communications subsystem and memory cooperate to: start a reset timer for a maximum tunnel count at a mobile device; on expiration of the reset timer, check whether a current value for the maximum tunnel count is less than a maximum value for the maximum tunnel count, and if yes, setting the current value of the maximum tunnel count to the maximum value of the maximum tunnel count.

Some networks allow limited data connections to be established. An algorithm, called watermarking, was created to discover how many connections were allowed at a particular time by a network. However, as indicated above, there are times when a network limits the allowed data connections. The setting may be set "permanently" on the device, meaning that the setting will exist on the device until the radio is cycled, typically by turning off power to the device.

The present disclosure provides for the reset of the number of allowed data connections when certain criteria are met. In one embodiment, the present disclosure ensures that "user-interactive" or "user-active" services are not disrupted by the resetting of the watermark. For example, if only one connection is configured and the user is watching streaming video, the data connections are not reset since, if the network is in a limited operation mode, this could potentially disrupt the streaming video.

Figure 1:
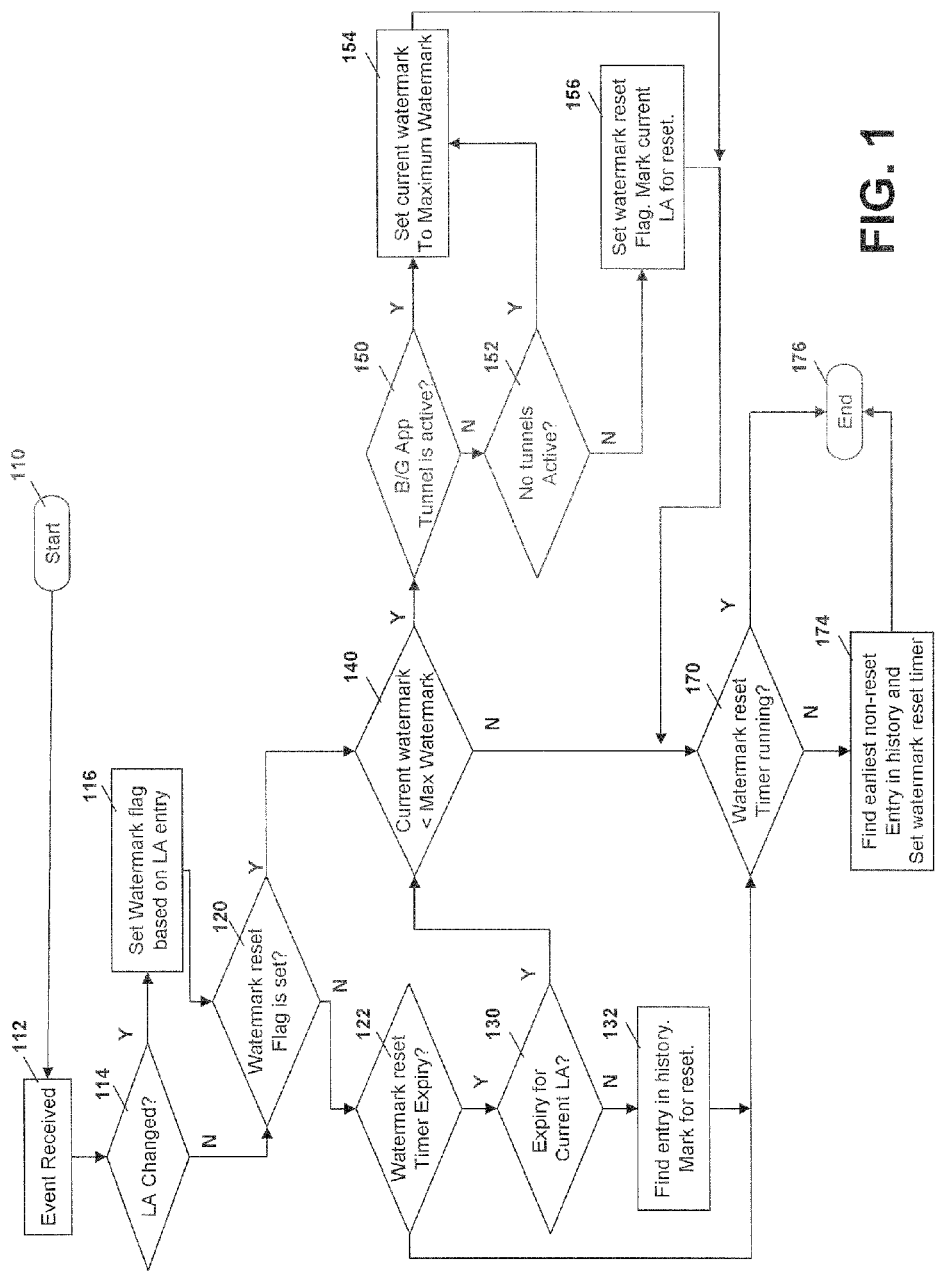
FIG. 1 is a process diagram showing resetting of a maximum tunnel watermark.

Reference is now made to FIG. 1, which shows an exemplary process for resetting a watermark at a device. Those skilled in the art will appreciate that the embodiment of FIG. 1 is merely exemplary, and changes could be made to the process therein.

FIG. 1 shows a process diagram for resetting a watermark. As will be appreciated by those in the art, in certain situations the maximum watermark permitted by a network may be greater than the current maximum watermark that the mobile device thinks is applicable.

The process of FIG. 1 starts at block 110 and proceeds to block 112 in which an event is received. In one embodiment, the process of FIG. 1 is a task message loop which will start on any event occurring.

The process then proceeds to block 114 in which a check is made to determine whether a location area has changed. As will be appreciated by those skilled in the art, "location area" is a set of base stations that are grouped together to optimize signaling.

If the location area has changed, as determined by block 114, the process proceeds to block 116. In block 116 the watermark reset flag is set based on the location area entry for the new location area. In particular, a watermark reset flat is provided for the current location area. The watermark reset flag can be either true or false. If it is false, then there is no reset indicated for the watermark. If the watermark reset flag is set to true then the watermark may be reset, as provided below.

From block 114, if the location area has not changed, or from block 116, the process proceeds to block 120. In block 120 a check is made to determine whether the watermark reset flag is set. As will be appreciated, this may be because the location area changed and the watermark reset flag for that location area was true or it can be that that location area watermark reset flag was set based on the expiration of a timer previously.

From block 120, if the watermark reset flag is not set, the process proceeds to block 122 in which a check is made to determine whether a watermark reset timer has expired.

Figure 2:
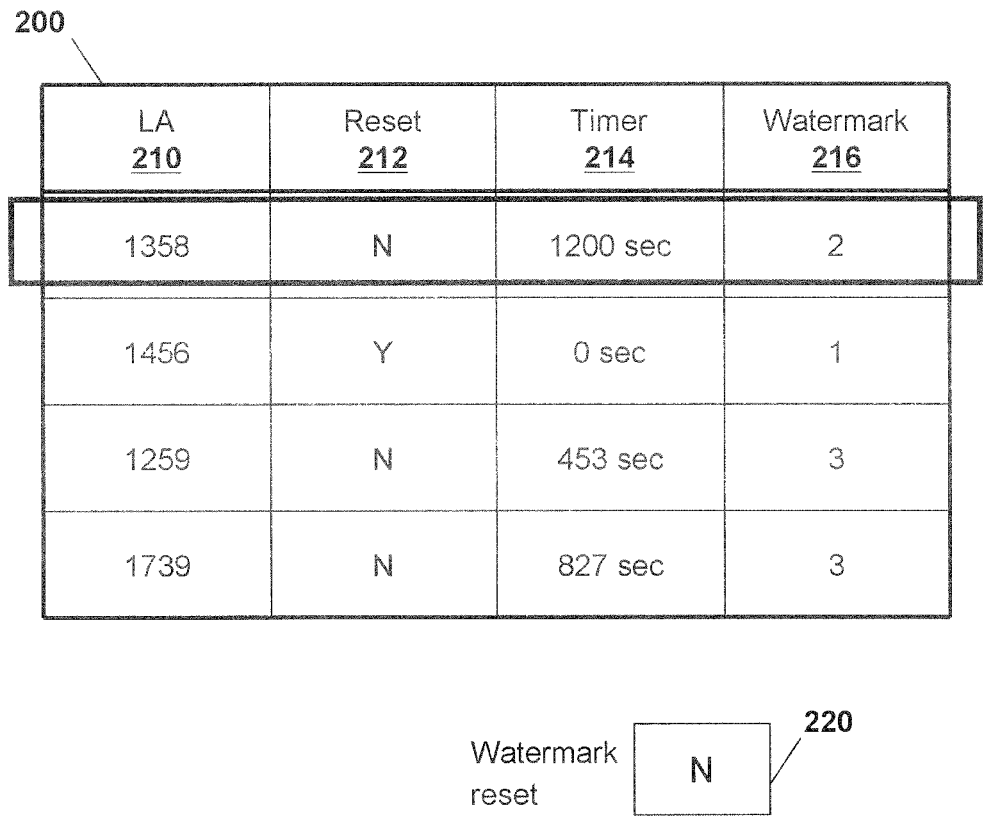
FIG. 2 is a block diagram showing a reset table as well as a current watermark.

In one embodiment, the mobile device may keep a history table in which the location areas, watermark reset timer values and a current reset entry can be provided. For example, reference is made to FIG. 2, which shows a history table 200. In FIG. 2, column 210 provides for a location area identifier. As will be appreciated by those in the art, the location area identifier can be any identifier which uniquely identifies the location area or alternatively any other network identifier.

Further, column 212 provides for whether a reset indicator is set for that location area. The location indicator may be set, for example, based on the expiration of the watermark reset timer for that location area.

Column 214 provides for a timer value for the location area. In the example of FIG. 2, the timer value is for a count down time and is shown in seconds. However, any timer value could be utilized including one that counted up or based on an absolute time, and could be based on clock cycles or other measurements. The values and units for column 214 are thus only provided as an example.

Column 216 provides for the current watermark value for the location area. As indicated above, the current watermark value may be less than the maximum watermark value in certain situations, and under certain conditions may need to be reset.

In one embodiment, a mobile device will know the maximum watermark for a particular technology. In this case, the timer may, in some instances, only be started when the watermark for the network is less than the maximum watermark. If the watermark for the network is the same as the maximum watermark, in one embodiment no timer is started. Thus, for example, in FIG. 2 the last two networks in the table may have a maximum watermark of 4 or more in order for the timer to be started, since column 216 indicates the current watermark of "3" for each of these networks. This is, however, not meant to be limiting.

Further, in FIG. 2, the watermark reset value 220 is provided. This indicates whether the current location area is set to be reset.

The current location area, in the example of FIG. 2, is shown as location area 1356, which has a timer value of 1200 seconds, a reset indicator as NO and a current watermark as two tunnels. Other location areas include one which has the timer expired and therefore a reset indicator has been set.

A third location area provides for a reset value of and a timer value of 453 seconds with a current watermark value set to 3.

Referring again to FIG. 1 the check in block 122 checks whether any of the rows in the watermark table, for example the table of FIG. 2, have expired. If YES the process proceeds to block 130 in which a check is made to determine whether the expiration of the watermark timer was for the current location area. As will be appreciated, if the mobile device moves from one location area to another, the timer in the first location area may continue to count down until it expires, which may be determined by block 130.

If the expiration of the watermark reset timer is not for the current location area, the process proceeds to block 132 in which the entry is marked for reset in the history table. For example, in the second row of table 200 the location area 1456 has been marked for reset even though it is not the current location area.

If the watermark reset flag for the current location area, as determined by block 120, is set, or if the expiration of the watermark reset timer is determined to be for the current location area, as determined in block 130, the process proceeds to block 140. In block 140 a check is made to determine whether the current watermark is less than the maximum watermark. As will be appreciated, the current watermark may be less in situations where a network was busy and thus was only allowing a certain number of tunnels to be established from each mobile device. When the network becomes less busy, the maximum watermark may increase. Thus, the current watermark which is set on the device may be less than the maximum watermark.

From block 140, if the current watermark is less than the maximum watermark, the process of FIG. 1 proceeds to block 150 in which a check is made to determine whether a background tunnel is active. If not, the process proceeds to block 152 and determines whether there are no tunnels active.

From block 150, if the background application tunnel is active, or from block 152 if no tunnels are active, the process proceeds to block 154 in which the current watermark is set to the maximum watermark.

The checks of block 150 and block 152 are used to prevent disruption of "user interactive" or "user active" data services. For example, if a user is watching a streaming video over a tunnel, the setting of the current watermark to the maximum watermark may disrupt the video, which may cause a negative user experience.

Thus, the checks of block 150 and 152 determine either that nothing is happening on the device or that there is a background application that can be taken down, ensuring that there is no disruption in.

The process at block 154 sets the current watermark to the maximum watermark, thus overcoming the limitations of the lower setting on the watermark that was previously configured.

From block 152, if there are tunnels active, then the process proceeds to block 156 in which the watermark reset flag is marked for the current location area reset. As will be appreciated, this will cause the process to proceed from block 120 directly to block 140 on the next iteration of the process of FIG. 1. However, the process will wait until the user is finished with whatever foreground applications, such as the streaming video, prior to resetting the current watermark to the maximum watermark in block 154.

From block 122, if the watermark reset timer has not expired, or from block 132 after the entry has been marked for reset, or from block 156 if the watermark reset flag is marked for the current location area reset, or from block 154 if the current watermark is set to the maximum watermark, the process proceeds to block 170. In block 170 a check is made to determine whether the watermark reset timer is running. If yes, the process may end in block 176. From block 170, if the watermark reset timer is not running the process proceeds to block 174 in which the history table is checked to find the earnest non-reset entry in the history table and starting the watermark reset timer for that entry.

From block 174 the process proceeds to block 176 and ends.

As will be appreciated by those in the art, the ending at blocks 170 or 176 merely causes a loop to the start 110 in which a task or event is waited for to start the whole process again.

Reference is now made to FIG. 3. FIG. 3 shows a history table 300 in which the user has moved to a new location area 1456. Location area 1456 has a reset flag as YES and a timer value of 0.

With the history table of FIG. 3, the process of FIG. 1 proceeds block 112 into block 114, in which a check is made to determine whether the location area has changed. Since the location area has changed the process proceeds to block 116 in which the watermark reset flag is set based on the location area entry in the table. In this case, the location area entry in the table says YES and therefore the watermark reset flag is also set to YES as shown by block 320.

The process then proceeds to block 120 in which a check is made to determine whether the watermark reset flag is set, which it is, and the process therefore proceeds to 140 in which a check is made to determine whether the current watermark is less than the maximum watermark. From the table of FIG. 3, the current watermark is set to 1. In this case, assume a current maximum watermark of 3. Since the current watermark is less than the maximum watermark, the process proceeds to block 150.

Assuming that the user is not using a foreground application and has either a background tunnel active or no tunnels active, then the process proceeds to block 154 in which the current watermark is set to the maximum watermark. After block 154, the current watermark is now 3, thereby allowing the mobile device to open three tunnels.

The process then proceeds to block 170 to start any watermark timers if they are not running. In this case, as soon as the current watermark was set to the maximum watermark then a timer should be started for the current location area.

The process proceeds to wait for a new event to be received in block 112.

As will be appreciated by those skilled in the art, the process of FIG. 1 is merely exemplary, and in some embodiments various blocks are optional, or additional blocks could be added. For example, in some embodiments blocks 150 and 152 could be omitted. In other embodiments, the check at block 170 could be omitted.

The above therefore provides for a process for checking whether a watermark reset timer for a current watermark has expired, and if so, proceeding to reset the current watermark to the maximum watermark. The resetting may involve checking whether the current watermark is less than the maximum watermark. The resetting may further involve checking that there is no currently active tunnel with no other background tunnel, and if there is a currently active tunnel with no background tunnel, simply marking the current watermark value for reset when the currently active tunnel is finished.

The watermark reset tinier can be checked on each iteration of the process and if no watermark reset timer is running then the earliest non-reset entry timer can be started.

The value of the watermark reset timer can be preconfigured at the device during manufacture, configured on the device through signaling or user interface, or provisioned to the device. The actual value of the watermark reset timer value may be determined to ensure that the watermark reset does not occur too frequently to drain battery resources, but occurs often enough to ensure that the maximum number of tunnels is maintained.

Figure 4:
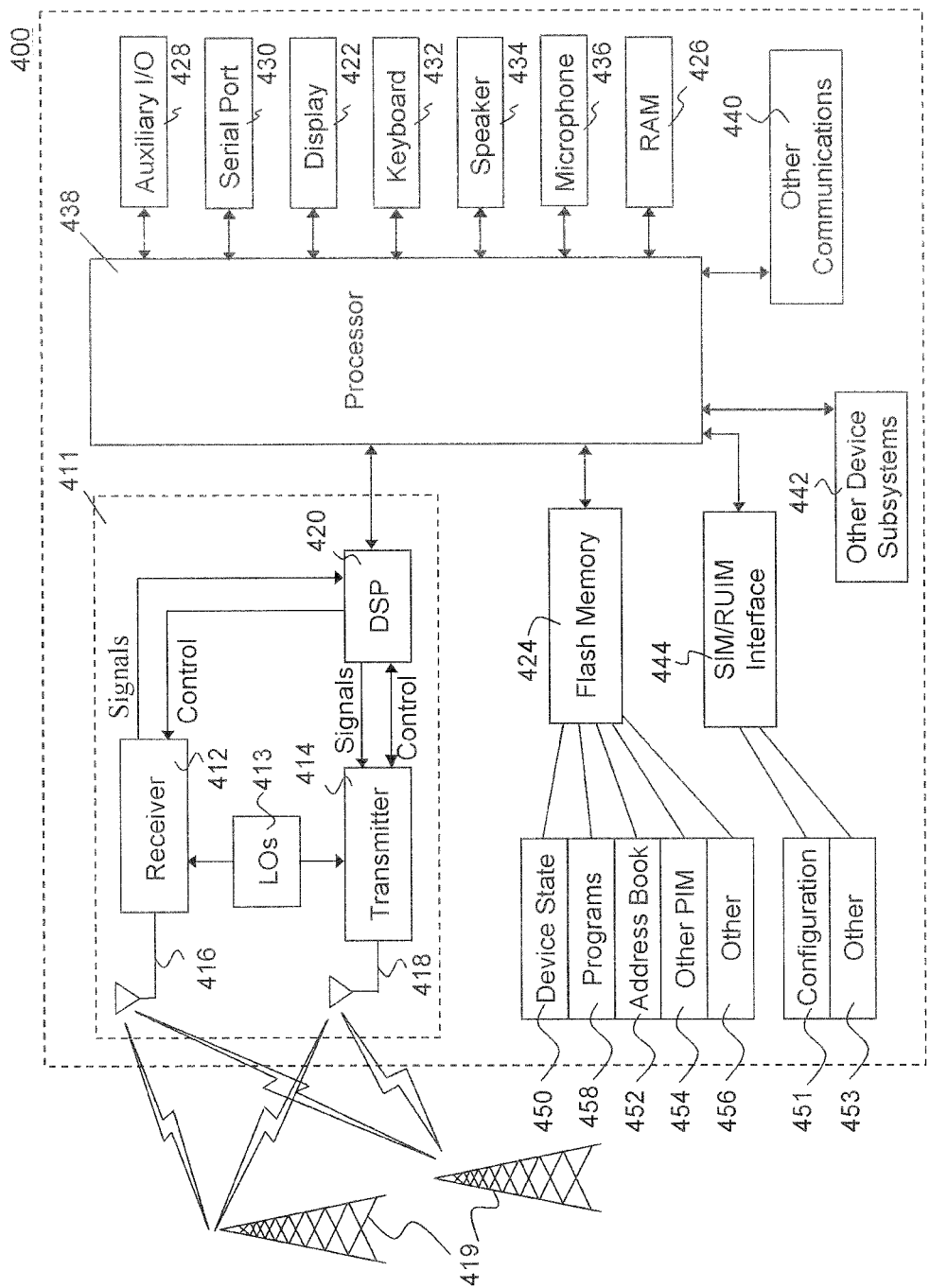
FIG. 4 is a block diagram of an exemplary mobile device.

As will be appreciated, the configuring and checking of expiration a watermark reset timer, the checking of radio access bearers/tunnels and the resetting of a current watermark is done utilizing the processor on a mobile device, in combination with a communications subsystem of the mobile device. One such exemplary mobile device is illustrated below with reference to FIG. 4. The mobile device of FIG. 4 is however not meant to be limiting and other mobile devices could also be used.

Mobile device 400 is typically a two-way wireless communication device having voice and data communication capabilities. Mobile device 400 generally has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, a wireless device, a user equipment, or a data communication device, as examples.

Where mobile device 400 is enabled for two-way communication, it will incorporate a communication subsystem 411, including both a receiver 412 and a transmitter 414, as well as associated components such as one or more antenna elements 416 and 418, local oscillators (LOs) 413, and a processing module such as a digital signal processor (DSP) 420. As will be apparent to those skilled in the field of communications, the particular design of the communication subsystem 411 will be dependent upon the communication network in which the device is intended to operate.

Network access requirements will also vary depending upon the type of network 419. In some CDMA networks network access is associated with a subscriber or user of mobile device 400. A CDMA mobile device may require a removable user identity module (RUIM) or a subscriber identity module (SIM) card in order to operate on a CDMA network. The SIM/RUIM interface 444 is normally similar to a card-slot into which a SIM/RUIM card can be inserted and ejected like a diskette or PCMCIA card. The SIM/RUIM card can have memory and hold many key configuration 451, and other information 453 such as identification, and subscriber related information.

When required network registration or activation procedures have been completed, mobile device 400 may send and receive communication signals over the network 419. As illustrated in FIG. 4, network 419 can consist of multiple base stations communicating with the mobile device. For example, in a hybrid CDMA 1x EVDO system, a CDMA base station and an EVDO base station communicate with the mobile station and the mobile device is connected to both simultaneously. The EVDO and CDMA 1x base stations use different paging slots to communicate with the mobile device.

Signals received by antenna 416 through communication network 419 are input to receiver 412, which may perform such common receiver functions as signal amplification, frequency down conversion, filtering, channel selection and the like, and in the example system shown in FIG. 4, analog to digital (A/D) conversion. ND conversion of a received signal allows more complex communication functions such as demodulation and decoding to be performed in the DSP 420. In a similar manner, signals to be transmitted are processed, including modulation and encoding for example, by DSP 420 and input to transmitter 414 for digital to analog conversion, frequency up conversion, filtering, amplification and transmission over the communication network 419 via antenna 418. DSP 420 not only processes communication signals, but also provides for receiver and transmitter control. For example, the gains applied to communication signals in receiver 412 and transmitter 414 may be adaptively controlled through automatic gain control algorithms implemented in DSP 420.

Mobile device 400 generally includes a processor 438 which controls the overall operation of the device. Communication functions, including data and voice communications, are performed through communication subsystem 411. Processor 438 also interacts with further device subsystems such as the display 422, flash memory 424, random access memory (RAM) 426, auxiliary input/output (I/O) subsystems 428, serial port 430, one or more keyboards or keypads 432, speaker 434, microphone 436, other communication subsystem 440 such as a short-range communications subsystem and any other device subsystems generally designated as 442. Serial port 430 could include a USB port or other port known to those in the art.

Some of the subsystems shown in FIG. 4 perform communication-related functions, whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list.

Operating system software used by the processor 438 may be stored in a persistent store such as flash memory 424, which may instead be a read-only memory (ROM) or similar storage element (not shown). Those skilled in the art will appreciate that the operating system, specific device applications, or parts thereof, may be temporarily loaded into a volatile memory such as RAM 426. Received communication signals may also be stored in RAM 426.

As shown, flash memory 424 can be segregated into different areas for both computer programs 458 and program data storage 450, 452, 454 and 456. These different storage types indicate that each program can allocate a portion of flash memory 424 for their own data storage requirements. Processor 438, in addition to its operating system functions, may enable execution of software applications on the mobile device. A predetermined set of applications that control basic operations, including at least data and voice communication applications for example, will normally be installed on mobile device 400 during manufacturing. Other applications could be installed subsequently or dynamically.

Applications and software, such as those for implements the process of FIGS. 1 to 3, may be stored on any computer readable storage medium. The computer readable storage medium may be a tangible or intransitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application may have the ability to send and receive data items, via the wireless network 419. In one embodiment, the PIM data items are seamlessly integrated, synchronized and updated, via the wireless network 419, with the mobile device user's corresponding data items stored or associated with a host computer system. Further applications may also be loaded onto the mobile device 400 through the network 419, an auxiliary I/O subsystem 428, serial port 430, short-range communications subsystem 440 or any other suitable subsystem 442, and installed by a user in the RAM 426 or a non-volatile store (not shown) for execution by the processor 438. Such flexibility in application installation increases the functionality of the device and may provide enhanced on-device functions, communication-related functions, or both. For example, secure communication applications may enable electronic commerce functions and other such financial transactions to be performed using the mobile device 400.

In a data communication mode, a received signal such as a text message or web page download will be processed by the communication subsystem 411 and input to the processor 438, which may further process the received signal for output to the display 422, or alternatively to an auxiliary I/O device 426.

A user of mobile device 400 may also compose data items such as email messages for example, using the keyboard 432, which may be a complete alphanumeric keyboard or telephone-type keypad, among others, in conjunction with the display 422 and possibly an auxiliary I/O device 428. Such composed items may then be transmitted over a communication network through the communication subsystem 411.

For voice communications, overall operation of mobile device 400 is similar, except that received signals would typically be output to a speaker 434 and signals for transmission would be generated by a microphone 436. Alternative voice or audio I/O subsystems, such as a voice message recording subsystem, may also be implemented on mobile device 400. Although voice or audio signal output is preferably accomplished primarily through the speaker 434, display 422 may also be used to provide an indication of the identity of a calling party, the duration of a voice call, or other voice call related information for example.

Serial port 430 in FIG. 4 would normally be implemented in a personal digital assistant (PDA)-type mobile device for which synchronization with a user's desktop computer (not shown) may be desirable, but is an optional device component. Such a port 430 would enable a user to set preferences through an external device or software application and would extend the capabilities of mobile device 400 by providing for information or software downloads to mobile device 400 other than through a wireless communication network. The alternate download path may for example be used to load an encryption key onto the device through a direct and thus reliable and trusted connection to thereby enable secure device communication. As will be appreciated by those skilled in the art, serial port 430 can further be used to connect the mobile device to a computer to act as a modem.

Other communications subsystems 440, such as a short-range communications subsystem, is a further optional component which may provide for communication between mobile device 400 and different systems or devices, which need not necessarily be similar devices. For example, the subsystem 440 may include an infrared device and associated circuits and components or a Bluetooth™ communication module to provide for communication with similarly enabled systems and devices.

While the above examples utilize PDP contexts in 3GPP networks such as HSDPA networks, the solution is equally applicable to other networks, which include but are not limited to Universal Mobile Telecommunications System (UMTS) networks, Global System for Mobile telephony (GSM) networks, Long Term Evolution (LTE) networks, among others. For example, in UMTS, the channels are cumulative and the data must therefore be shared between the channels.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method comprising:
   starting a reset timer for a maximum tunnel count at a mobile device the reset timer being associated with a location area of the mobile device;
   on expiration of the reset timer, if a current location area of the mobile device is associated with the expired reset timer, checking whether a current value for the maximum tunnel count is less than a maximum value for the maximum tunnel count permitted by a network, and
      if yes, setting the current value of the maximum tunnel count to the maximum value of the maximum tunnel count permitted by the network; and
   if the current location area of the mobile device is not associated with the expired reset timer, flagging an entry for the location area associated with the expired reset timer.

2. The method of claim 1, further comprising storing a history table having an entry for at least one location area, each of the entries containing a current value for the maximum tunnel count and a reset timer value for the location area of the entry.

3. The method of claim 2, wherein the flagging the entry for the location area associated with the expired timer results in the maximum tunnel count being reset upon registry of the mobile device with the location area associated with the expired reset timer.

4. The method of claim 3, wherein the flagging marks the entry for the location area associated with the expired reset timer for reset within the history table.

5. The method of claim 4, further comprising checking for a reset flag when registering with a new location area, and if the reset flag for the new location area indicates reset, setting the current value of the maximum tunnel count to the maximum value of the maximum tunnel count permitted by the network.

6. The method of claim 5, wherein, prior to the setting step, checking whether a background application tunnel is active,
   if a back ground application tunnel is not active, checking wheather no tunnel is active, and
      if a background application tunnel is not active and a tunnel is active, flagging a current location area for reset and skipping the setting step.

7. The method of claim 2, further comprising, after the setting step, checking whether at least one reset timer is running, and if no, starting the reset timer for an earliest non-reset entry.

8. The method of claim 1, wherein, prior to the setting step, checking whether a background application tunnel is active,
   if a background application tunnel is not active, checking whether no tunnel is active, and
   if a background application tunnel is not active and a tunnel is active, flagging a current location area for reset and skipping the setting step.

9. The method of claim 1, wherein the maximum tunnel count is for a packet data protocol context in a third generation partnership project network.

10. A mobile device comprising:
    a processor;
    a communications subsystem; and
    memory;
    wherein the processor, communications subsystem and memory cooperate to:
       start a reset timer for a maximum tunnel count at a mobile device, the reset timer being associated with a location area of the mobile device;
       on expiration of the reset timer, if a current location area of the mobile device is associated with the expired reset timer, check whether a current value for the maximum tunnel count is less than a maximum value for the maximum tunnel count permitted by a network, and
          if yes, setting the current value of the maximum tunnel count to the maximum value of the maximum tunnel count permitted by the network; and
       if the current location area of the mobile device is not associated with the expired reset timer, flag an entry for the location area associated with the expired reset timer.

11. The mobile device of claim 10, further comprising storing, in the memory, a history table having an entry for at least one location area, each of the entries containing a current value for the maximum tunnel count and a reset timer value for the location area of the entry.

12. The mobile device of claim 11, wherein flagging the entry for the location area associated with the expired reset timer results in the maximum tunnel count being reset upon registry of the mobile device with the location area associated with the expired reset timer.

13. The mobile device of claim 12, wherein the flagging marks the entry for the location area associated with the expired reset timer for reset within the history table.

14. The mobile device of claim 13, wherein the processor, communications subsystem and memory further cooperate to check for a reset flag when registering with a new location area, and if the reset flag for the new location area indicates reset, set the current value of the maximum tunnel count to the maximum value of the maximum tunnel count permitted by the network.

15. The mobile device of claim 14, wherein the processor, communications subsystem and memory further cooperate to, prior to the setting step, check whether a background application tunnel is active,
    if a background application tunnel is not active, checking whether no tunnel is active, and
    if a background application tunnel is not active and a tunnel is active, flagging a current location area for reset and skipping the setting step.

16. The mobile device of claim 11, wherein the processor, communications subsystem and memory further cooperate to, after the setting step, check whether at least one reset timer is running, and if no, starting the reset timer for an earliest non-reset entry.

17. The mobile device of claim 10, wherein the processor, communications subsystem and memory further cooperate to, prior to the setting step, check whether a background application tunnel is active,
    if a background application tunnel is not active, checking whether no tunnel is active, and
    if a background application tunnel is not active and a tunnel is active, flagging a current location area for reset and skipping the setting step.

18. The mobile device of claim 10, wherein the maximum tunnel count is for a packet data protocol context in a third generation partnership project network.

* * * * *